United States Patent [19]

Sigloch et al.

[11] 4,419,797
[45] Dec. 13, 1983

[54] MACHINING CENTER

[76] Inventors: K. Eugen Sigloch, Nachsommerweg 33, D-7000 Stuttgart-Freiberg; Gerhard Stark, Beethovenstrasse 21, D-7311 Notzingen, both of Fed. Rep. of Germany

[21] Appl. No.: 206,642

[22] Filed: Nov. 13, 1980

[30] Foreign Application Priority Data

Nov. 13, 1979 [DE] Fed. Rep. of Germany ....... 2945770

[51] Int. Cl.$^3$ ...................... B23B 39/20; B23Q 3/157
[52] U.S. Cl. .................................... 29/26 A; 29/568; 408/35
[58] Field of Search .................. 29/26 A, 568; 408/35

[56] References Cited

U.S. PATENT DOCUMENTS

| Re. 25,670 | 10/1964 | Hansen et al. | 29/568 X |
|---|---|---|---|
| 3,473,419 | 10/1969 | Ollearo | 408/35 |
| 4,223,579 | 9/1980 | Stark et al. | 408/35 X |

FOREIGN PATENT DOCUMENTS

2140203 2/1973 Fed. Rep. of Germany ........ 408/35

Primary Examiner—Z. R. Bilinsky
Attorney, Agent, or Firm—Antonelli, Terry & Wands

[57] ABSTRACT

A machining center for at least one of a drilling or milling operation. The machining center includes a machine frame at which an outrigger is attached, with a tool spindle, driveable to execute stroke movements and rotary movements, being mounted to the outrigger. The tool spindle is adapted to be moved from an end position, in alignment with a tool carrier present in the tool magazine and connectible to the tool spindle, axially for being coupled to the tool carrier and then further movable axially for machining of workpieces. The tool spindle is rotatably mounted at a slide arranged at the outrigger and guided along a straight guide extending in parallel to an axis of rotation of the tool spindle. The slide serves for axial movement of the tool spindle for executing axial strokes intended for workpiece machining and for an exchange of a tool carrier. The slide has a zone through which the tool spindle extends, which zone may pass through a gap of the tool magazine. Upon each tool carrier change, the gap may be engaged by the respective tool carrier to be coupled to the tool spindle, which tool carrier is carried by a magazine connecting member in order to enable a coupling to the tool spindle. The straight guide for the slide is arranged at a spacing from the zone of the machine frame carrying the outrigger.

38 Claims, 4 Drawing Figures

MACHINING CENTER

The present invention relates to a machining center and, more particularly, to a machining center for drilling and/or milling, with the center including a machine frame having an outrigger attached thereto, and a tool spindle, mounted on the outrigger, adapted to be driven so as to execute stroke movements and rotary movements with the tool spindle being movable from an end position, in alignment with a tool carrier present in a tool magazine and connectible to the tool spindle, axially for being coupled to the tool carrier and then further movable axially for enabling a machining of workpieces, wherein the tool carrier in the coupling position is supported by a magazine connecting member which, after a coupling of the tool carrier to the tool spindle, permits an entrainment of the tool carrier by the tool spindle.

Machining centers of the aforementioned type have been proposed in, for example, Offenlungsschrift No. 2,140,203. In the proposed machining centers it is customary to support the tool spindle in a substantially cylindrical sleeve coaxial to the spindle and supported in the outrigger with straight guidance. The sleeve is called a quill unit and is extended vertically downwardly out of the outrigger, which outrigger is attached to a vertical column of the machine frame. The arrangement enables the coupling of a tool carrier present on intermediate magazine link or magazine connecting member to the tool spindle. Once the coupling has been accomplished, the quill unit is extended still further downwardly from the outrigger out of the straight quilled unit guide in order to machine the respective workpiece by means of the tool attached to the tool holder rotatably mounted in the tool carrier.

Machining centers of the aforementioned type, utilized especially as drilling machines, do permit a quick tool change, for example, three seconds or less; however, such quick tool change is at the cost of disadvantages which strongly restrict the possible uses of such a machine center.

More particularly, one disadvantage of the proposed conventional machine center resides in the fact that the quill units may only be constructed so as to have a limited structural length and only a relatively short length is possible for the straight guide means thereof.

A further disadvantage of the proposed machining units resides in the fact that since the quill unit, in order to execute a downward stroke, extends downwardly from its straight guide means and thus its unsupported zone, freely projecting beyond the straight guide means, increases in correspondence with the size of the downward stroke, only relatively short strokes are possible in view of the required machining accuracy for workpieces or otherwise a satisfactory machining accuracy can be attained.

In addition to drilling or boring, such machine centers are also generally used for milling. During a milling operation, especially large transverse forces are exerted on the rotating milling tool. The large transverse forces are transmitted to the quill unit; however, since the quill unit projects far beyond the straight guide means, the use of a quill unit is especially disadvantageous and considerably limits the accuracy attainable in milling operations.

Moreover, considerably great alternating stresses are exerted on the quill unit during a milling while the quill unit projects considerably past its straight guide means in the downward direction. This also results in a high stress on the guide bushings and bushings supporting the quill unit and, consequently, any play in the straight guide means may increase relatively quickly during the course of an operating period of time thereby resulting in even greater machining inaccuracies.

In a further machining center employed especially as a drilling machine and, optionally, for milling purposes, it has been proposed, for machining purposes, to extend the tool spindle directly without a quill unit receiving the same downwardly from its straight guide. Even though this approach is more economical than an arrangement utilizing quill units, the above-noted disadvantages of machining centers with quill units are, in such a situation, even further aggravated.

In order to be able to machine workpieces with larger downward strokes of the tool spindle, other machining centers have been proposed which likewise serve for drilling and milling purposes wherein the entire outrigger, also called a head, with a drive mechanism and magazine is adjustable at a vertical column by means of a sliding guide vertically to the stroke movement serving for the workpiece machining process. In these constructions, the rotational axis of the tool magazine is, in most cases, inclined obliquely with respect to the vertical. Since the entire outrigger is moved up and down for executing the stroke movements necessary for machining a workpiece, these proposed machining centers would make it possible to execute large machining strokes; however, since the tools carried by the magazine, due to the participation of the magazine in the stroke movements of the outrigger, namely, the actual taking part in the stroke movements, the actual useable stroke is even smaller than in the case of machining centers with quill units since care must be taken that the unused tools carried by the magazine do not enter into an interference range with workpiece to be machined.

A further disadvantage of the last mentioned proposed machining center resides in the fact that the tool spindle is of a large spacing from the vertical guide track for the outrigger, which track is provided at the vertical column. However, the larger the spacing, the larger the inaccuracies of the position of the tool spindle axis of rotation in planes vertical thereto and also those of the axial stroke positions of the tool spindle. Moreover, there is also the dangerous possibility that the outrigger rears up or is lifted up under the advancing force.

A further disadvantage resides in the fact that, due to the large overhang of the tool spindle, vibrations occur due to lateral forces. An additional disadvantage resides in the fact that it is necessary to move large masses and, relatively large wear and tear occurs. Furthermore, the tool change requires more time than in machining centers with a quill unit due to the lower stroke velocities of the outrigger.

Machining centers with tool changing devices have also been proposed wherein the tool magazine is arranged somehere apart from the outrigger so that the tools must be taken from the magazine by means of transfer devices such as, for example, gripper means, not associated with the tool magazine, with the tools then being moved in this fashion to the tool spindle and withdrawn therefrom and transported back into the magazine. These proposed machining centers are constructed with a quill unit advance of the tool spindle as well as with a slide advance of the tool spindle. However, all of these proposed maching centers have common disadvantages in that the tool changing device is structurally expensive, and the tool change requires substantially more time than in the case of machining centers with quill units. For example, a tool change could take at least 10 seconds. This time requirement may have a considerable effect considering that there are frequently operations where the machine time itself is only a few seconds.

The aim underlying the present invention essentially resides in providing a machining center, especially for drilling and/or milling wherein a tool carrier to be respectively coupled to a tool spindle is present in a magazine when it is coupled to the tool spindle and again decoupled therefrom, and wherein a very rapid tool change is possible, and wherein a high machining accuracy and substantially larger operating strokes of the tool spindle are possible than in the case of machining centers with quill unit feeds.

In accordance with advantageous features of the present invention, the tool spindle is rotatably supported on a slide, with the slide being arranged at the outrigger and guided along a straight guide extending parallel to an axis of rotation of the tool spindle. The slide serves for an axial movement of the tool spindle for executing the axial strokes for the purpose of workpiece machining and tool carrier change. The slide has a zone which is penetrated by the tool spindle, with the zone of the slide being adapted to pass through a gap of the tool magazine. The gap of the tool magazine is adapted to be filled, upon each tool carrier change, with the tool carrier which is to be respectively coupled anew to the tool spindle and is supported by an intermediate magazine link so that the tool carrier can be coupled to the tool spindle. The straight guide for the slide is arranged at a spacing from the zone of the magazine frame carrying the outrigger.

By virtue of the above-noted features of the present invention, the shortcomings and disadvantages of the proposed machining centers, constructed for drilling, and optionally milling operations as well as even further operations such as countersinking, recessing, etc., are avoided.

Preferably, in accordance with the present invention, the machining center has a single tool spindle so as to enable the production of the machining center in an economical fashion and permit substantially larger working strokes of the tool spindle than in the previous maching centers with quill units, while nevertheless permitting a very quick tool change and the attainment of very high machining accuracies.

It is especially expedient and preferable in accordance with the present invention to provide that the bearing surfaces present at the slide and extended on the straight guide present on the outrigger may project, during the workpiece machining, either not at all or at most only to a slight extent beyond the straight guide in a direction toward the workpiece so that the slide guidance is optimal at all times and therefore uniformly high machining accuracies can be obtained over an entire operating stroke. Additionally, since the slide needs to have only a very short overhang, the moving masses of the center of the present invention may be relatively small so that is is possible, to turn, to provide relatively high maximum slide feeding speeds. The machining center of the present invention is especially well suitable, in addition to drilling operations, also milling operations because the slide, without the danger of lateral deflection, may absorb high transverse machining forces exerted by the workpiece on the tool without there being any suffering in the machine accuracy or the rigidity. Preferably, for a milling operation, the clamping device is associated with the slide, with the clamping device being capable of fixedly clamping the slide in any desired position serving for the respective milling operation along its straight guide, which clamping device preferably fixes the slide without play simultaneously in both directions. Advantageously, the straight guide for the slide may be preferably a sliding straight guide and correspondingly the bearing surfaces of the sliding guide therealong may be formed as sliding tracks; however, it is also possible to utilize an antifriction-bearing-type straight guide for the slide.

In spite of the large stroke of the slide possible with the machining center in accordance with the present invention, the structural height of the housing of the outrigger, as measured in a direction of the tool spindle axis, may be smaller than in the case of machining centers employing quill units.

Moreover, since the slide is arranged at the outrigger, it is possible without any problems to maintain the spacing of the tool spindle from the straight guide of the slide at a relatively small magnitude or to arrange the tool spindle between the sliding tracks or roller or antifriction elements of the straight guide supported at the slide so that the tool spindle, relative to the straight guide, has only an insignificant overhang, which likewise has a very favorable effect on high machining accuracy.

It is also possible in accordance with the present invention, at least in many instances, due to the possibility of large strokes of the slide, to arrange the outrigger immovably at the frame of the machine center, that is, for example, to cast the housing integrally with the frame housing and thereby attain optimum rigidity. However, if desired, it is also to provide the outrigger to be arranged at the machine frame so as to be displaceable and lockable on a sliding straight guide. The positional adjustability of the outrigger however does not serve for moving the same during the workpiece machining, but rather merely serves for being able to set varying positions of the outrigger prior to a start of the workpiece machining steps in order to make it possible to machine workpieces of greatly varying heights. Consequently, during a workpiece machining operation, the outrigger is not adjusted.

Preferably, the machine frame of the machining center of the present invention includes a vertical column to which the machine base is fixedly or firmly mounted. The machine base may normally advantageously carry a coordinate table on which the workpiece to be machined may be fixed in place. In this situation, a longitudinal axis of the tool spindle may be suitably vertically oriented and, correspondingly, the feeding direction of the slide proceed vertically. However, for special cases, it is also possible to arrange the longitudinal axis of the tool spindle to be obliquely inclined with respect to the vertical, or to be perpendicularly inclined with respect to the vertical, and to provide a corresponding slide feeding direction.

While a machining center of the present invention may serve especially as a drilling machine and, as noted above, for milling purposes, other operations for which it may be used are, for example, thread cutting, reaming, countersinking, precision turning of cylindrical inner or outer surfaces, recessing, and, in certain cases, even other work possible with tools operable by means of the tool spindle.

The tool machine of the machining center of the present invention may be constructed identically or similarly to the tool magazine in machining centers with quill units, that is, the tool magazine may include two mutually concentric first tracks for the tool carriers, with the tracks lying in the same plane, being immovably arranged at the outrigger, and having the shape of a circular arc. The tracks terminate on both sides of the intermediate magazine link when the latter is located at a level of the first tracks and thus extends these tracks by its own second tracks into a practically endless track. However, it is also possible, with a corresponding construction of the tool carrier, to arrange the second tracks of the intermediate magazine link, during a tool change, relative to the axis of the tool spindle, to be offset with respect to the first tacks, or to construct the intermediate magazine link in some other suitable fashion.

If after a coupling of the tool carrier supported by the intermediate magazine link, the tool spindle is further moved by advancement of the slide in a direction toward the workpiece to be machined, in accordance with the present invention, the intermediate magazine link frees the passage of the projecting zone of the slide, penetrated by the tool spindle, through the gap of the magazine, so that the slide may execute the feeding steps required for machining the workpieces unhindered or uneffected by the magazine and the intermediate magazine link or magazine connecting member.

Preferably, the tool carrier carrying the tool may be in the form of a single tool carrier, that is, one having a single tool holder, rotatably supported at the carrier, for carrying a single tool such as, for example, a drill or a milling cutter. However, it is also possible to provide for multiple tool carriers rotatably supporting several tool holders for holding several tools simultaneously driven by the tool spindle such as, for example, several mutually parallel drills. The multiple tool carrier in this case with a gear system for connecting its associated input shaft, driven by the tool spindle, to the holders rotatably mounted to the tool carrier.

The tracks of the magazine serving for supporting the tool carriers while preferably sliding tracks, need not absolutely have the shape of a circular arc, and it is also possible to provide different curved configurations. However, the displacement of the tool carriers on the magazine tracks becomes especially simple by using a single wheel if the tracks are of a circular arcuate shape. In place of a wheel, as can readily be appreciated, other drive mechanisms may be provided for displacing the tool carriers on the tracks of the magazine such as, for example, dogs or entraining means which are transported together by means of a chain of the like and which entrain the tool carriers.

The magazine connecting member carrying the tool carrier to be coupled to the tool spindle in alignment with the tool spindle may in accordance with the present invention, after connecting the tool carrier to the tool spindle, free the gap of the tool magazine intended for passage of the slide in varying ways. Preferably, all the parts of the magazine connecting member are mounted to spring-loaded supporting rods linearly guided at the slide and entrained with the tool carrier due to the entrainment of the tool carrier by the tool spindle. However, it is also possible to, for example, after connecting the tool carrier, to guide parts of the magazine connecting member, present in the gap of the magazine during connection of the tool carrier laterally out of the gap by means of a driven lever gear mechanism or the like.

The arrangement of the slide carrying the tool spindle at the outrigger is especially advantageous in such a way that the side of the slide facing away from the magazine is that side which is adjacent to the free end face of the outrigger so that the slide is arranged substantially between the magazine and the free end of the outrigger. In this case, the magazine is located essentially between the slide and the machine frame carrying the outrigger and, preferably, is mounted at the outrigger proper. This results in an especially advantageous relationship for ruggedness or stability of the outrigger and permits the attainment of especially high machining accuracies. However, in some cases, other arrangements of the slide at the outrigger may be provided.

If the distance necessary between the tool spindle and frame area carrying the outrigger and associated with the machine frame does not have been especially large, the slide may be arranged on a longitudinal side of the outrigger. Although it is possible in some cases to mount the magazine at the machine frame carrying the outrigger rather than at the outrigger proper, or to mount the magazine at a special projection of the machine frame or at a second outrigger located at the machine frame, it is yet especially advantageous to arrange to the tool magazine at the outrigger since this results in, inter alia, a compact construction which is economical and especially simple from a constructional viewpoint. Moreover, the result is also automatically obtained that the magazine participates in the positional displacement of the outrigger. In contrast thereto if the magazine is provided at a separate second outrigger, this special second outrigger must be adjusted together with the first outrigger. In this situation, the two outriggers will then suitably be rigidly joined together so that they can, in turn, form a single combined outrigger.

Accordingly, it is an object of the present invention to provide a machining center, especially for drilling and/or milling, which avoids, by simple means, shortcomings and disadvantages encountered in the prior art.

Another object of the present invention resides in providing a machining center, especially for drilling and/or milling which exhibits the advantages of a rapid tool change comparable to the tool change of machining centers with quill units, without adopting the disadvantages of centers with quill units.

Yet another object of the present invention resides in providing a machining center, especially for drilling and/or milling which enables the execution of very large slide strokes so as to enable the machining of workpieces which heretofore could not have been worked on with the use of machining centers having quill units.

A further object of the present invention resides in providing a machining center, especially for drilling and/or milling which minimizes if not avoids the danger of the slide rearing up in case of the application of a strong feeding force of the slide.

A further object of the present invention resides in providing a machining center, especially for drilling and/or milling which is simple in construction and more economical to manufacture than machine centers with quill units.

A still further object of the present invention resides in providing a machine center, especially for drilling and/or milling, which functions realiably under all operating conditions.

Yet another object of the present invention resides in providing a machining center, especially for drilling and/or milling which enables the carrying out of workpieces machining with high accuracy and precision.

A still further object of the present invention resides in providing a machining center, especially for drilling and/or milling which has relatively high maximum slide feeding speeds.

These and other objects, features, and advantages of the present invention will become more apparent from the following description when taken in connection with the accompanying drawings which show, for the purposes of illustration only, one embodiment in accordance with the present invention, and wherein:

FIG. 1 is a partially schematic side view of a machining center in accordance with the present invention;

FIG. 4 is a fragmentary frontal view, on an enlarged scale, of a detail of the magazine of the machining center of FIGS. 1–3. p Referring now to the drawings wherein like reference numerals are used throughout the various views to designate like parts and, more particular, to FIG. 1, according to this Figure, a machining center generally designated by the reference numeral 10 includes a machine frame generally designated by the reference numeral 11 with a machine base 12 to which a vertical column 15, shown broken away, is firmly joined. The vertical column 15 includes a vertical straight guide track 13 for an outrigger generally designated by the reference numeral 14 which extends over the machine base 12 and is vertically adjustably mounted to the vertical column 15. A motor (not shown) in the form of, for example, a reciprocating or lifting cylinder may serve for vertically adjusting the outrigger 14. Once the outrigger 14 is adjusted to a desired position for carrying out a machining operation, the outrigger 14 is clamped firmly to the column 15 in the adjusted vertical position so that a completely rigid connection is established between the outrigger 14 and the vertical column 15. The desired or set height adjustment of the outrigger 14 is not altered during machining of workpieces 17.

Figures 1, 4:
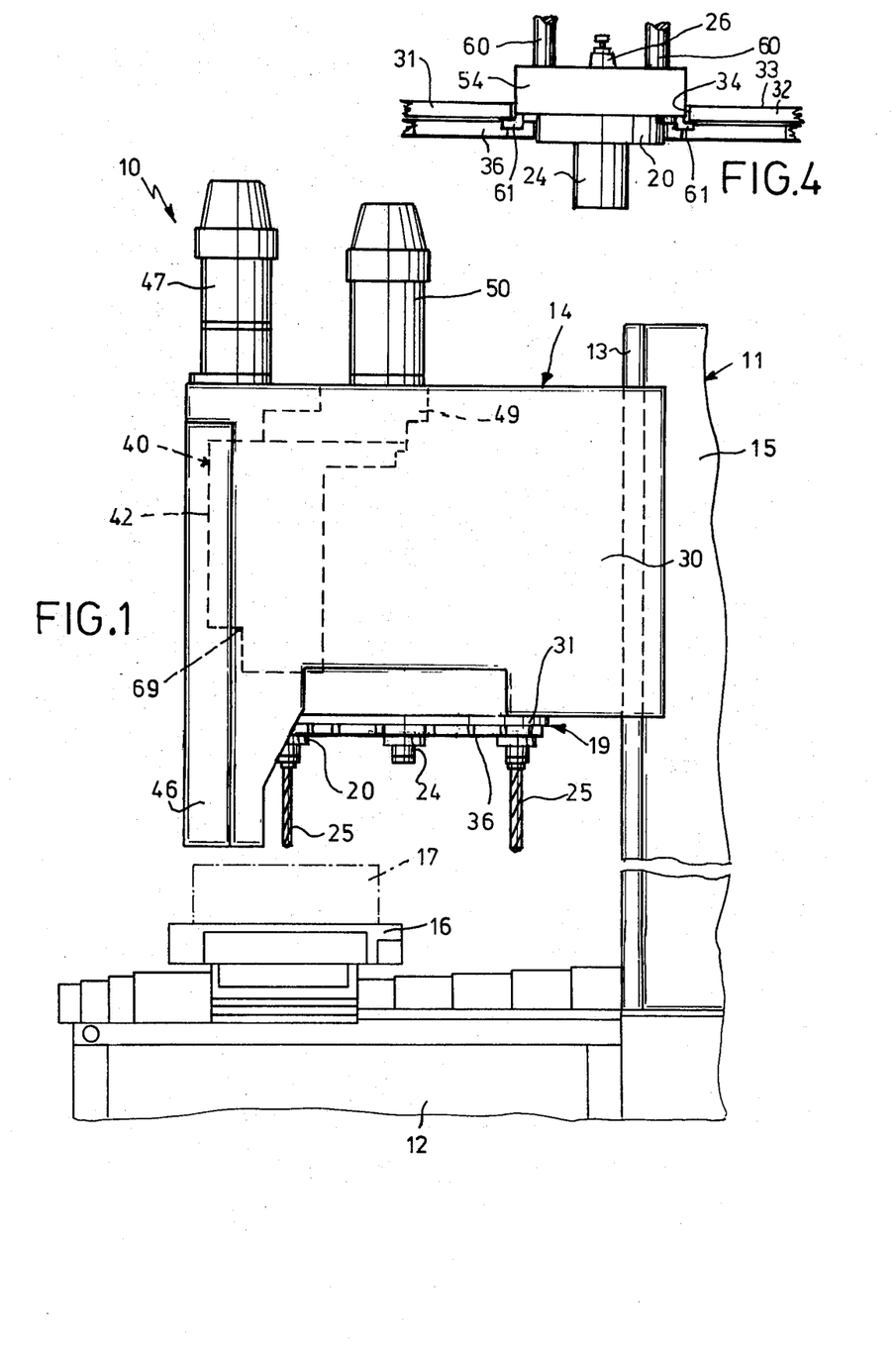

A coordinate table 16, of conventional construction, is arranged on the machine base 12 and serves for holding and adjusting of the respective workpieces 17 to be machined. The machining center 10 may be manually controlled; however, preferably, the control is accomplished, in a conventional manner, by means of a program control arrangement.

Figure 3:
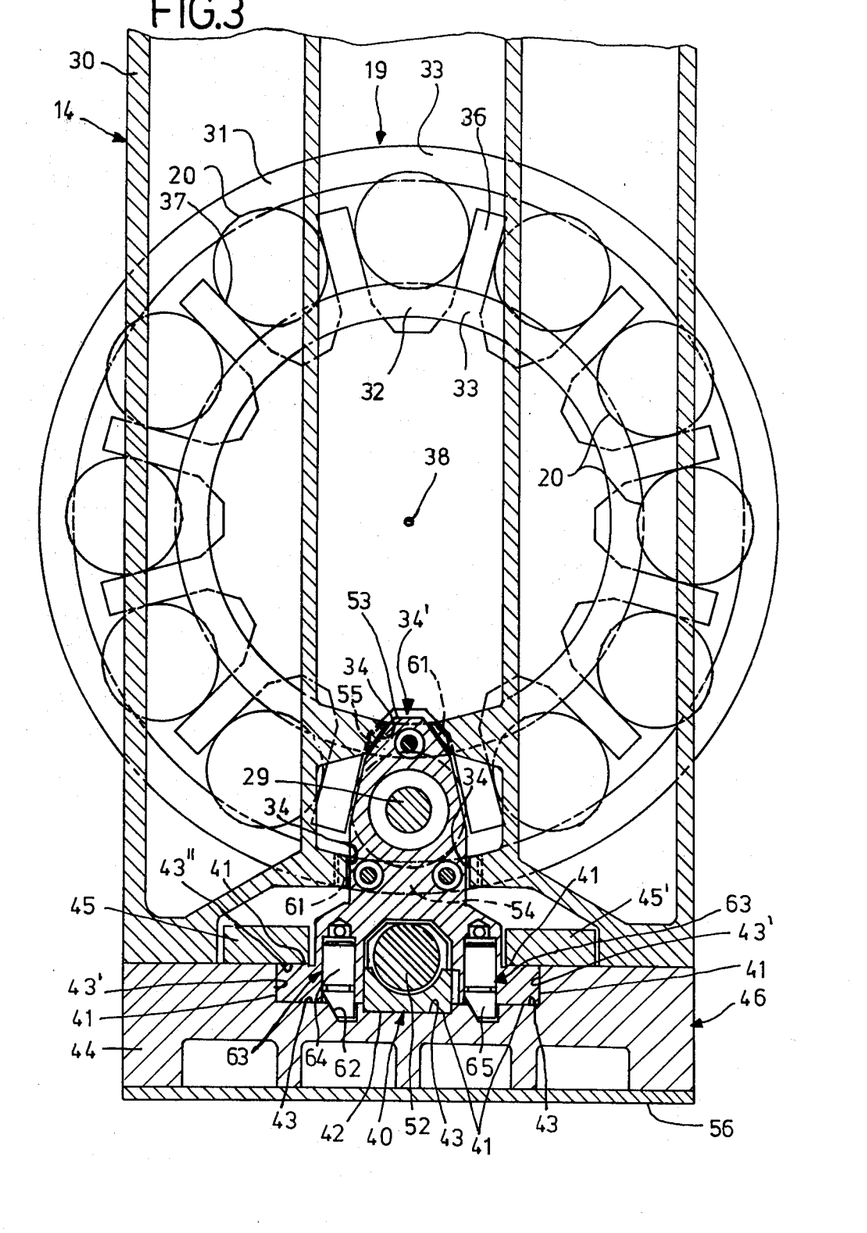
FIG. 3 is a cross sectional view taken along the lines III—III in FIG. 2.

As shown most clearly in FIG. 3, a tool magazine generally designated by the reference numeral 19 is mounted to an underside of the outrigger 14. The tool magazine 19 serves for the simultaneous storing of a plurality of individual tool carriers 20 which, in the illustrated embodiment number twelve.

Figure 2:
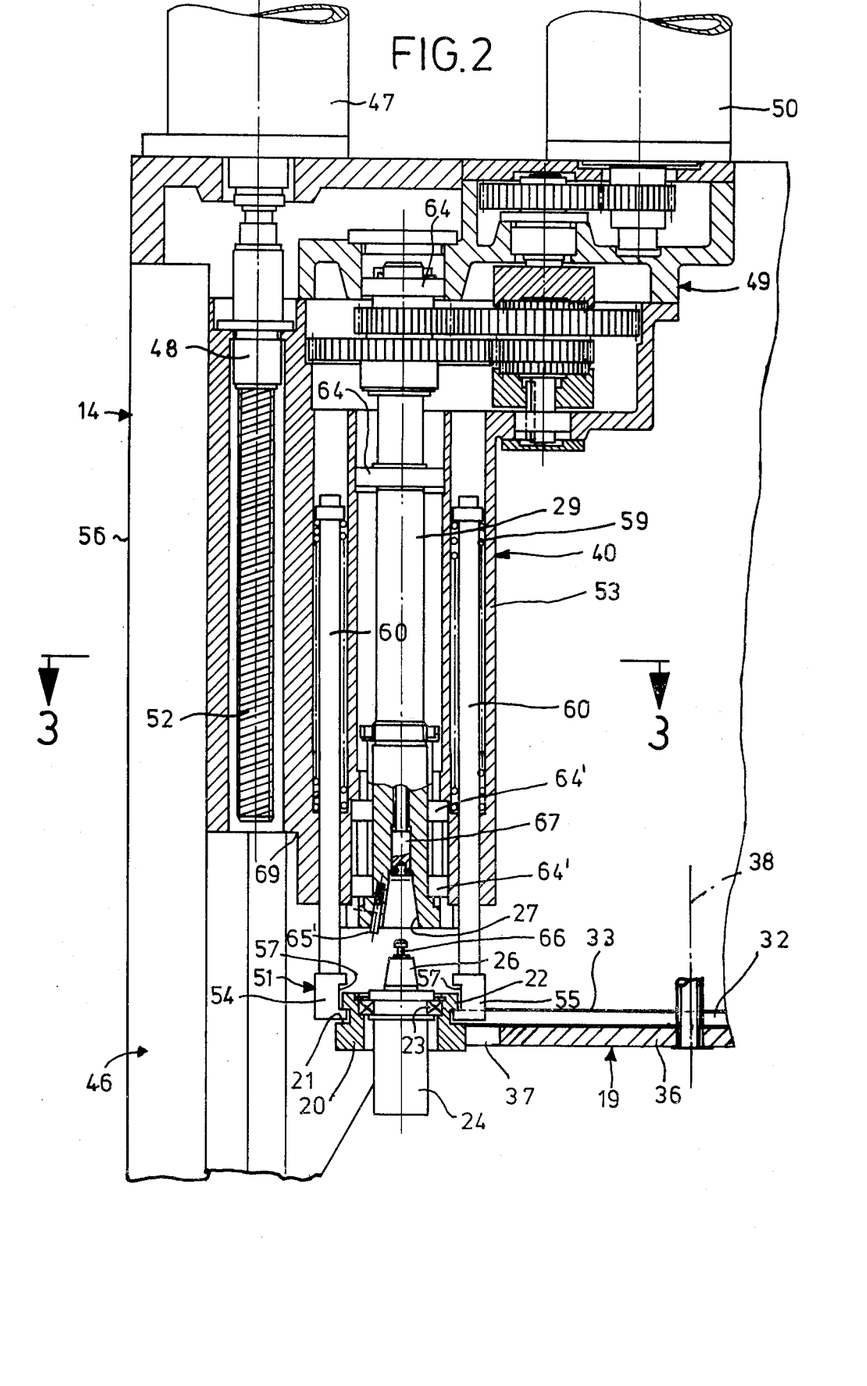
FIG. 2 is a partial cross sectional enlarged lateral view of the machining center of FIG. 1.

As shown most clearly in FIG. 2, each tool carrier 20 includes a rotationally symmetrical outer sleeve provided with an outside peripheral groove 21 and a flange 22. The flange 22 defines the upper extent of the peripheral groove 21. A tool holder 24 extends through or penetrates the outer sleeve of the tool carrier 20 and is rotatably mounted about a vertical axis of rotation by antifriction bearings 23. The tool holder 24 serves for a concentric holding of a tool 25 (FIG. 1) which, preferably, is a drill or a milling cutter.

The tool holder 24 includes a mandrel 26 having the shape of a truncated cone. The mandrel 26 is adapted to shape-matingly engage into a complimentary central conical bore 27 provided in a lower end face of a tool spindle 29. In this manner, the mandrel 26 brings the axis of rotation of the tool holder 24 with the tool 25 to be coupled into an exact alignment with the axis of rotation of the tool spindle 29. The manner of coupling the tool holder to the tool spindle 29 for rotation therewith will be described in greater detail hereinbelow. By virtue of the rotatable mounting of the tool holder 24 in the tool carrier 20 by the bearing 23, the outer sleeve of the tool carrier 20, supporting the tool holder 24, need not participate in the rotation of the tool holder 24 which occurs during operation.

The outrigger 14 includes a rigid housing 30 (FIG. 1) and, as shown most clearly in FIG. 3, two mutually concentric rings 31, 32 of the magazine are attached to the outrigger 14 with upper flat surfaces of the rings 31, 32 forming circular-arc-shaped sliding tracks 33 which lie in a common horizontal plane. The sliding tracks accommodate the flanges 22 of the tool carriers 20 so that the flange 22 of the respective tool carriers 20 rests at two mutually diametrically opposite regions on the sliding tracks 33.

In FIG. 3, for the sake of clarity, the tool carrier is resting on the sliding tracks 33 are merely indicated by their contours, and the tool holders, rotatably mounted in the sleeves have been omitted. The rings 31, 32 are not closed but rather each one is provided with an interruption 34 so as to provide a gap generally designated by the reference numeral 34' in the magazine 19. The gap 34', as shown in FIG. 3, lies, advantageously, with respect to the magazine 19 in a diametrical opposition to a zone of the magazine 19 which lies the nearest to the vertical column 15. The vertical longitudinal plane of symmetry of the outrigger 14 represents a plane of symmetry for the rings 31, 32 and the gap 34'.

As shown most clearly in FIGS. 1, 2, and 4, a stellate or star wheel 36 is arranged coaxially to the rings 31, 32 at a small spacing below the rings 31, 32. The star wheel 36 includes a recess 37 on a side of the periphery for each tool carrier in order to positively or shape-matingly entrain the respective tool carriers. The star wheel 36 is adapted to be rotated about an axis of rotation 38 by a suitable drive means such as, for example, a motor (not shown).

A slide generally designated by the reference numeral 40, as shown in FIG. 2, rotatably supports the tool spindle 29 and is guided in a shape-mating fashion on a straight sliding guide generally designated by the reference numeral 46 fixedly mounted at the outrigger 14 and, preferably, arranged to be releasable, so that the slide 40 may be moved vertically up and down. In some situations, in place of the straight sliding guide 46, it is possible to provide a straight guide with antifriction bearings.

As shown in FIG. 3, the vertical rear portion 42 facing away from the vertical column 15 and pertaining to the slide 40, constitutes sliding surfaces 41 guided on three planar sliding tracks 43. Furthermore, two planar lateral edges of the slide 40 also form sliding surfaces 41 which are extended along sliding tracks 43' of the straight guide 46. The sliding tracks 43' extend at right angles to the sliding tracks 43. Additionally, two further planar sliding surfaces 41, facing the magazine 19, are provided at the slide 40 and are guided on opposed sliding tracks 43″ of the straight guide 46. The sliding tracks 43, 43′ and 43″, immovably mounted to the outrigger 14, thus guide the slide 40 in the vertical direction along a linear path. The sliding 43, 43′, 43″ are arranged on plate-like parts 44, 45, 45′ which are firmly joined together and thus form the straight guide 46 for the slide 40. Suitably, the straight guide 46 may constitute a structural unit with the slide 40 being linearly guided by the guide 46. The structural unit may be releasably attached to the rigid housing 30 of the outrigger 14. With such a construction, an economical manufacture is realized even in a case of a very small series production. Moreover, such a construction permits, if necessary, a subsequent modification of an already existing machining center.

The vertical longitudinal plane of symmetry for the outrigger 14 also forms a plane of symmetry for the slide 40 and the straight guide 46.

A drive mechanism is provided for enabling an advancement of the slide 40. The drive mechanism includes an electric motor 47, the speed or number of revolutions of which is controllable or adjustable. The electric motor 47 is attached or mounted to a top or ceiling of the housing 30 of the outrigger 14. As shown in FIG. 2, the motor 47 serves for rotationally driving a threaded spindle 52. The axial position of the threaded spindle 52 with respect to the outrigger 14 does not change when the threaded spindle 52 is driven by the electric motor 47. The thread of the threaded spindle 52 meshes with an internal thread of a threaded sleeve 48. The threaded sleeve 48 is fixedly positioned in a vertical passage bore of the slide 40. By turning the threaded spindle 52 in a lefthand or righthand direction, the slide 40 may be thus moved vertically upwardly and downwardly.

A geared indexing drive unit generally designated by the reference numeral 49 is attached to the slide 40. The geared indexing drive unit drives the tool spindle 29 so as to cause the tool spindle 29 to execute a rotary motion, with an adjustable speed, selectively in the lefthand or righthand directon by means of an electric drive motor 50 attached to an upper side of the housing of the gear unit 49. FIG. 2 provides an example of the housing of the motors 37, 50 in broken away views.

The rear portion 42 of the slide 40, facing away from the vertical column 15, faces a free end face or front side 56 of the outrigger 14 and is in close proximity thereto thereby resulting in such an arrangement of the slide at the outrigger 14, that an extensive overhang of the tool spindle 29 is obtained with respect to the vertical column 15, that is, a large spacing of the tool spindle 29 from the vertical column 15 and an advantageous accommodating of the magazine 19. A zone 53 of the slide 40, is penetrated by the tool spindle 29, and projecting toward the vertical column 15, is maintained so as to be so narrow that it can pass, with small lateral clearance, through the gap 34′ of the magazine 19 formed by the interruptions 34 in the two rings 31, 32. Consequently, the slide 40 may execute the downward strokes which are necessary for workpiece machining while the zone 53, which has lug-shaped cross sectional configuration, passes through the gap 34 of the magazine 19.

As shown in FIG. 2, the slide 40, in the illustrated uppermost position, is completely spaced apart from the magazine 19 and is disposed thereabove. In this uppermost position, a magazine connecting member generally designated by the reference numeral 51 is located in the gap 34′. The connecting member 51 includes two spaced apart segments 54, 55 each having the shape of a circular arc.

The segment 54 is supported by two vertically supporting rods 60, with the segment 55 being carried by one vertical supporting rod 60. As shown in FIG. 2, the supporting rods 60 are supported and linearly guided in bores of the slide 40 and are constantly spring loaded in an upward direction by biased compression springs 59 which rest against the slide 40 so that the supporting rods 60 are urged by the springs 59 into the uppermost position illustrated in FIG. 2 and maintained in such position by the compression springs 59 until, during a downward movement of the slide 40, the tool spindle 29 entrains the tool carrier 20 with the tool holder 24 in a shape-mating or frictional connection in the downward direction. In the uppermost position of the segments 54, 55, shown in FIG. 2, lateral abutments 61 (FIG. 4), having the shape of narrow lateral projections of the segments 54, 55 and fixedly mounted to the latter, are respectively in contact with the undersides of the associated rings 31, 32.

In the uppermost positions thereby determined, the segments 54, 55 are disposed with a minor lateral play in the interruptions 34 of the rings 31, 32 and thus substantially fill the interruptions 34. Consequently, the rings 31, 32 are completed so as to practically be closed rings by the segments 54, 55 in their uppermost position. The uppermost position of the segments 54, 55 may also be called a coupling position, since this position serves for respectively coupling and de-coupling the tool carrier 20 carried thereby to and form the tool spindle 29. These segments 54, 55 may together support a tool carrier 20 and they are located, with respect to the tool carrier 20 in diametrical opposition to each other. The vertical longitudinal plane of symmetry of the outrigger 14 also forms a plane of symmetry for each of these two segments 54, 55. The segments 54, 55, on their mutually facing inner sides, are respectively provided with one channel 57. The channels 57 have the shape of a circular arc and the bottoms of the channels 57 are, in the uppermost position of the segments 54, 55, as shown in FIG. 2, exactly at a level of the sliding tracks 33 of the rings 31, 32 of the magazine 19 so that thereby the circular-arc-shaped sliding tracks guiding the tool carriers 20 in the magazine 19 are practically endless in the uppermost position of the segments 54, 55. Thus, the tool carriers 20 may be shifted as desired in the magazine by the star wheel 36.

The connecting member 51 may merely carry a single tool carrier 20 involving, in each case, the tool carrier 20 in alignment with the tool spindle 29. The tool carrier 20 is brought into this position by rotating the star wheel 36 in order to couple the tool carrier 20 to the tool spindle 29. By a rotation of the wheel 36, it is thus possible to place any desired tool carrier 20, supported on the rings 31, 32 in the tool magazine 19, into engagement with the magazine connecting member 51 for coupling to the tool spindle 29. The coupling is accomplished by connecting the tool holder 24, rotatably mounted in the outer sleeve of the tool carrier 20, with the tool spindle 29 is a nonrotatably fashion and then locking the same in place.

As shown in FIG. 3, clamping means generally designated by the reference numeral 63 for fixedly clamping the slide 40 in any desired working position are provided in the slide 40 and cooperate with channels 62 in the rearward sliding tracks 43 of the outrigger 14. The clamping means 63 include horizontal bores countersunk into a rear face of the slide 40. The bores from cylinders for slidingly accommodating pistons 64. The pistons carry clamping elements 65 with inclined clamping faces which may cooperate with the correspondingly inclined side walls of the channels 62 located on the lefthand side for fixedly clamping the slide 40 in the straight guide 46. The clamping is effected by virtue of the fact that the pistons 64 may be urged into the channels 62 by a pressure medium such as, for example oil, introduced into the inner chambers of the cylinders, whereby the slide 40 is braced on both sides in the straight guide 46 and thus clamped in position. The fixing of the slide 40 preferably serves for the purpose of seating the slide 40 absolutely firmly during a milling operation to make accurate milling with milling cutters possible in this manner.

To non-rotatably couple the tool spindle 29 to a tool holder 24 carried in alignment therewith and at a spacing below the tool spindle 29 by the connecting member 51, the slide 40 is moved vertically downwardly from the illustrated uppermost position in FIG. 2. The non-rotatable coupling step is accomplished in the following manner.

Each tool holder 24 is provided in a top end face thereof with at least one groove which opens toward the top of the tool holder 24. During a downward movement of the slide 40 and the ensuing corresponding downward movement of the tool spindle 29, a driving pin 65' (FIG. 2), resiliently mounted in a direction of its longitudinal axis in a bore in a lower end face of the tool spindle 29, is adapted to shape-matingly engage the at least one groove in the tool holder 24 to effect a non-rotatable coupling action.

In order to achieve the necessary shape-mating engagement of the driving pin 65' into an associated groove of the tool holder 24, the driving pin 65' is, on the one hand, supported, as noted above, to be axially resilient so that, unless it coincidentially engages the respective groove or one of the respective grooves of the tool holder 24 immediately upon a downward movement of the slide 40, it will initially rest on the upper end face of the tool holder 24. The slide 40 is then moved downwardly for a small distance into a position wherein the driving pin 65 has, to some extent, been resilient urged backward, but wherein the mandrel 26 has not yet come into contact with a wall of the conical bore 27. Then, the tool spindle 29 is briefly turned so that the driving pin 65' engages the groove or one of the associated grooves of the respective tool holder 24. Now the tool holder 24 is non-rotatably connected with the tool spindle 29.

At the stage wherein the tool holder 24 is non-rotatably connected with the tool spindle 29, the rotation of the tool spindle 29 may be cut off and, by means of a further downward movement of the slide 40, the mandrel 26 comes into a shape-mating engagement with the conical bore 27 of the tool spindle 29 since, due to the compression springs 59 acting on the supporting rods 60, the segments 54, 55 continue to be held in their uppermost positions wherein the abutments 61, arranged at the segments 54, 55 are in contact with the underside of the rings 31, 32. The supporting rods 60 thus initially do not, as yet, take part in the downward movement of the slide 40.

For an automatic locking of the tool holder 24 in its coupled position at the tool spindle 29, a pin 66 is provided in a center on a topside of the mandrel 26. The pin 66 has an enlarged head and is automatically locked, in a conventional manner, in the tool spindle 29 during a downward movement of the tool spindle 29. For this purpose, the tool spindle 29, above the conical bore 27, is provided with a central axial bore wherein a connecting or push rod 67 is accommodated. The connecting or push rod 67 is spring loaded in a downward direction and is adapted to be moved up and down relative to the axial bore by a minor amount. An opening or bore for accommodating the pin 66 is provided at a bottom or lower end of the connecting rod 67. The connecting rod 67 is also provided with lateral openings or recesses for supporting ball members which, when the connecting rod is in the lowermost position under a force of the springs acting on the rods 67, are adapted to be urged, by the enlarged head of the penetrating pin 66, practically without the use of force, outwardly into recesses in the tool spindle 29 to such an extent that the ball members extend with less than half their diameter into the recesses in the tool spindle 29. Once the enlarged head of the pin 66, due to the downward movement of the slide 40, has entirely entered the lower bore of the connecting rod 67, the enlarged head, during a further downward movement of the slide 40 and of the tool spindle 29, arrests the connecting rod 67. The arresting action is due to the fact that the spring 59, through the supporting rods 60, continue to hold the segments 54, 55 with their abutments 61 in contact with the rings 31, 32. At this stage, the tool spindle 29 contacts the ball members with a bore zone which is not provided with recesses for accommodating the ball members and the ball members are urged beneath the enlarged head of the pin 66 so as to lock the pin 66 in place. During a further downward movement of the slide 40, the tool holder 24 and thus the tool carrier 20 and the segments 54, 55 with the supporting rods 60 are entrained by the tool spindle 29 in the downward direction so that thereby the segments 54, 55 uncover the gap 34' of the magazine 19 for the subsequent entrance and passage of the projection 53 of the slide 40.

It is also possible to provide constructions wherein the segments 54, 55 do not participate in the downward movement of the tool carrier 20 but rather are taken out of the path of motion of the slide 40 directly after a coupling of the tool carrier 20 to the tool spindle 29 in some other manner such as, for example, by moving the segments 54, 55 laterally and then moving the segments back only shortly before decoupling of the tool carrier 20 into a position wherein the segments 54, 55 then again support the tool carrier 20. However, it is generally particularly advantageous and simple from a constructional viewpoint to move the connecting member 51 downwardly together with the tool carrier 20.

During a downward movement of the slide 40, a zone 53 of the slide 40, through which the tool spindle 29 extends, enters the gap 34' of the magazine 19 and passes partially therethrough so that the workpiece 17, arranged on the coordinate table 16, may be subjected to a cutting machining operation by means of the tool 25 mounted in the respective tool holder 24. By virtue of this arrangement, a cutting machining process is possible wherein large working strokes may be executed.

If a tool change is required, the slide 40 is returned into the uppermost position illustrated in FIG. 2 and the upward motion of the slide 40 may be executed without interruption. As soon as the upward movement of the segments 54, 55 is stopped by abutment of their lateral projections 61 against the undersides of the rings 31, 32, the enlarged head of the pin 66 arrests the connecting rod 67 so that, during the further upward movement of the tool spindle 25, the inner recesses, provided in the tool spindle 29 for accommodating the ball members, arrive at or come to the level of the ball members and the ball members are thus urged by the enlarged head of the pin into the recesses. Thus, the tool holder 24 is unlocked again and, consequently, the tool carrier 20 which includes the tool holder 24 remains at the magazine connecting member 51; whereas, the tool spindle 29, together with the slide 40, continues its upward movement. Additionally, the driving pin 65' then comes out of engagement with the tool holder 24 and, at this stage, by turning or advancing the star wheel 36 into a coupling position, another tool carrier may be placed in alignment with the tool spindle 29 beneath the tool spindle 29 and pushed onto the segment 54, 55, whereupon this tool carrier as described above, is automatically coupled to the tool spindle 29 during a subsequent downward movement of the slide 40.

The axial position of the tool spindle 29 is invariable with respect to the slide 40 so that the tool spindle 29 exactly participates in the stroke movements of the slide 40. The tool spindle 29 is rotatably supported with high precision in the slide 40 by means of four antifriction bearings 64'.

To maintain the sliding bearing surfaces 41 of the slide 40 sliding along the sliding tracks 43, 43', 43", of the straight guide 46 constantly in contact with these sliding tracks 43, 43', 43" along their entire length during the possible large strokes of the slide 40, as shown most clearly in FIG. 1, the straight guide 46 projects downwardly beyond the magazine 19 and, preferably, extends up to approximately a level of a free tip of the longest normal tool 25 being employed when the tool is clamped in the tool holder 24 of a tool carrier 20 present in the magazine 19. In this connection, normal tools are understood to mean tools which are utilized for normal drilling and/or milling operations. Thus, so called normal tools are not special tools utilized for special applications.

Furthermore, the zone 53 of the slide 40 which accommodates the tool spindle 29, projects downwardly in a direction toward the coordinate table as shown in FIGS. 1 and 3, beginning at the point 69 past the sliding surfaces 41 of the slide 40 gliding along the sliding tracks 43, 43', 43", of the straight guide 46. This arrangement permits the use of even larger strokes of the slide 40 while the sliding surfaces 41 of the slide 40 are in constant contact with the sliding tracks 43, 43' and 43" of the straight guide 46 along their full lengths.

As shown most clearly in FIGS. 1 and 2, the motor 50 serving for the rotational drive of the tool spindle 29 is firmly attached to the slide 40 and is mounted to the ceiling or top wall of the housing associated with the indexing drive 49, which is also fixedly mounted to the slide 40. However, it is also possible, though somewhat more expensive in constructional aspects, to arrange the drive motor 50 for the tool spindle at the outrigger 14 or at the machine frame 12 rather than at the slide 40. For example, in such an arrangement, the drive motor 50, when arranged at the outrigger 14, could drive a gear reducer unit (not shown) connected in front of the tool spindle 29 by means of a gear belt (not shown).

While we have shown and described only one embodiment in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

We claim:

1. A machining center for carrying out at least one of a drilling and milling operation, the machining center including a machine frame, an outrigger attached to the machine frame, a tool spindle means for rotatably driving a tool means, a tool carrier means for carrying the tool means, a tool magazine means for accommodating at least one tool carrier means, and means for mounting the tool spindle means to the outrigger so as to enable the tool spindle means to be displaced in an axial direction from an end position in alignment with a tool carrier means in the tool magazine means to a first position for enabling a coupling of the tool spindle means to the tool carrier means, and to at least one further position for machining a workpiece, and a magazine connecting means for supporting the tool carrier means during a coupling of the tool spindle means and for permitting an entrainment of the tool carrier means by the tool spindle means, characterized in that the mounting means includes a slide means arranged at the outrigger for enabling axial displacement of the tool spindle means, the tool spindle means extending through at least a zone of the slide means, means are provided for rotatably mounting the tool spindle means at the slide means, a guide means extends in parallel to an axis of rotation of the tool spindle means for guiding the slide means along a straight guide path, the guide means is arranged at a spacing from a portion of the machine frame to which the outrigger is attached, and includes at least one substantially planar slide track fixedly mounted on the outrigger, the tool magazine includes a gap for accommodating the tool carrier means to be supported by the magazine connecting means to be coupled with the tool spindle means and for enabling the zone of the slide means to pass through the tool magazine means, the slide means is arranged in a vicinity of a free end face of the outrigger, the free end face of the outrigger is disposed in a position facing away from the portion of the machine frame to which the outrigger is attached, and in that the zone of the slide means through which the tool spindle means extends faces the portion of the machine frame to which the outrigger is attached.

2. A machining center according to claim 1, characterized in that the tool magazine means further includes track means for carrying additional tool carrier means not in a coupling position, and in that means are provided for fixedly mounting the track means to the outrigger.

3. A machining center according to claim 2, characterized in that the track means for formed by two circularly arc-shaped mutually coaxial sliding tracks.

4. A machining center according to claim 3, characterized in that the magazine connecting means further includes a further track means for supporting a tool carrier means when said tool carrier means leaves the track means of the tool magazine means, and in that means are provided for shifting in unison all tool carrier means present in the tool magazine means and placing one of the tool carrier means to be coupled on the further track means.

5. A machining center according to claim 4, characterized in that the shifting means is a rotatably mounted star wheel, and in that the further track means are disposed in a plane of the first track means at least when the tool carrier means to be coupled is placed on the further track means.

6. A machining center according to claim 5, characterized in that the gap is disposed on a side of the magazine facing away from a portion of the machine frame to which the outrigger is attached.

7. A machining center according to claim 5, characterized in that the tool carrier means and the tool magazine means are adapted to be shifted by the shifting means in a plane extending perpendicular to the axis of rotation of the tool spindle means.

8. A machining center according to claim 7, characterized in that the tool spindle means has a longitudinal axis extending in the vertical direction, and in that the slide means is displaceable along a vertically extending axis.

9. A machining center according to claim 8, characterized in that the slide means includes bearing surfaces cooperable with the at least one planar slide track of said guide means, and in that the guide means are arranged so that the bearing surfaces travel along the guide means substantially over a full length thereof at all times during any possible workpiece machine operation.

10. A machining center according to claim 1, characterized in that the outrigger is attached to the machine frame so as to enable an adjustable positioning thereof.

11. A machining center according to claim 1, characterized in that means are provided for selectively fixedly clamping the slide means in an arbitrary operating position at the outrigger.

12. A machining center according to claim 8, characterized in that a first motor means is provided for rotatably driving the tool spindle means, and in that a second motor means is provided for axially displacing the slide means.

13. A machining center according to claim 12, characterized in that the first motor means is arranged on the slide means, and the second motor means is immovably arranged at the outrigger.

14. A machining center according to claim 8, characterized in that the magazine connecting means includes two diametrically opposed segments, and in that the segments include shoulder portions defining further track means, the two carrier means include a flanged portion adapted to be placed on the shoulder portions.

15. A machining center according to claim 14, characterized in that rod means are provided for supporting the segments in the slide means, the rod means are linearly guided in the slide means in parallel to a displacement direction of the slide means, and in that means are provided for spring-loading the rod means in an upward direction.

16. A machining center according to claim 8, characterized in that the tool magazine means is arranged at a position between the guide means for the slide means and the portion of the machine frame to which the outrigger is attached.

17. A machining center according to claim 16, characterized in that the guide means for the slide means extends beyond the tool magazine means in a direction toward a clamping device for clamping the workpiece to be machined.

18. A machining center according to claim 17, characterized in that the guide means extends beyond the tool magazine means to approximately a level of a free tip of a longest normal tool means arranged in the tool magazine means.

19. A machining center according to claim 17, characterized in that the zone of the slide means through which the tool spindle means extends projects beyond the bearing surface of the slide means guided along the guide means in a direction toward the clamping device.

20. A machining center according to claim 19, characterized in that the guide means and the slide means form a structural unit adapted to be detachably mounted to a housing of the outrigger.

21. A machining center according to claim 20, characterized in that at least one of the tool carrier means includes at least one single rotatably mounted tool holder means adapted to be coupled to the tool spindle means.

22. A machining center according to claim 20, characterized in that at least one tool carrier means is a multiple tool carrier means including a plurality of rotatably mounted tool holder means, and in that the plurality of rotatably mounted tool holder means are adapted to be driven by gear means and an input shaft which is adapted to be coupled to the tool spindle means by rotation therewith.

23. A machining center according to claim 15, characterized in that the segments are adapted to be arranged in the gap of the tool magazine means during a change of the tool carrier means.

24. A machining center according to one of claims 2 or 3, characterized in that the gap is formed by an interruption in the first track means.

25. A machining center according to one of claims 1, 2, or 3, characterized in that the gap is disposed on a side of the tool magazine facing away from the portion of the machine to which the outrigger is attached.

26. A machining center according to claim 1, characterized in that said guide means includes at least two substantially planar slide tracks extending substantially at a right angle with respect to each other, said substantially planar slide tracks are engageable with bearing surfaces of the slide means substantially over a full length thereof at all times during any possible workpiece machining operation.

27. A machining center according to claim 1, characterized in that said guide means includes at least three substantially planar slide tracks, each of said slide tracks extending substantially at a right angle with respect to an adjacent slide track so as to define a linear guide path accommodating portions of said slide means, said slide means including bearing surfaces respectively engageable with the side tracks of said guide means substantially over a full length thereof at all times during any possible workpiece machining operation.

28. A machining center according to one of claims 26 or 27, characterized in that the guide means for the slide means extends beyond the tool magazine means in a direction toward a clamping device for clamping the workpiece to be machined.

29. A machining center according to claim 28, characterized in that the guide means extends beyond the tool magazine means to approximately a level of a free tip of a longest normal tool means arranged in the tool magazine means.

30. A machining center for carrying out at least one of a drilling and milling operation, the machining center include a machine frame, an outrigger attached to the machine frame, a tool spindle means for rotatably driving a tool means, a tool carrier means for carrying the tool means, a tool magazine means for accommodating at least one tool carrier means, and means for mounting the tool spindle means to the outrigger so as to enable the tool spindle means to be displaced in an axial direction from an end position in alignment with a tool carrier means in the tool magazine means to a first position for enabling a coupling of the tool spindle means to the tool carrier means, and to at least one further position for machining a workpiece, and a magazine connecting means for supporting the tool carrier means during a coupling of the tool spindle means and for permitting an entrainment of the tool carrier means by the tool spindle means, characterized in that the mounting means includes a slide means arranged at the outrigger for enabling axial displacement of the tool spindle means, the tool spindle means extending through at least a zone of the slide means, means are provided for rotatably mounting the tool spindle means at the slide means, a guide means extends in parallel to an axis of rotation of the tool spindle means for guiding the slide means along a straight guide path, the guide means is arranged at a spacing from a portion of the machine frame to which the outrigger is attached, the tool magazine means includes a gap for accommodating the tool carrier means to be supported by the magazine connecting means to be coupled with the tool spindle means and for enabling the zone of the slide means to pass through the tool magazine means, and in that the guide means for the slide means extends beyond the tool magazine means in a direction toward a clamping device for clamping the workpiece to be machined.

31. A machining center according to claim 30, characterized in that the guide means are immovably mounted to the outrigger, and in that the clamping device includes a coordinate table for holding and adjusting the workpiece.

32. A machining center according to one of claims 1 or 30, characterized in that the tool spindle means has a longitudinal axis extending in the vertical direction and in that the slide means is displaceable along a vertically extending axis.

33. A machining center according to one of claims 1 or 30, characterized in that the slide means includes bearing surfaces cooperable with the guide means, and in that the guide means are arranged so that the bearing surfaces travel along the guide means substantially over a full length thereof at all times during any possible workpiece machining operation.

34. A machining center according to one of claims 1 or 30, characterized in that the magazine connecting means includes two diametrically opposed segments, and in that the segments include shoulder portions defining further track means, the tool carrier means include a flanged portion adapted to be placed on the shoulder portions.

35. A machining center according to one of claims 1 or 30, characterized in that the tool magazine means is arranged at a position between the guide means for the slide means and the portion of the machine frame to which the outrigger is attached.

36. A machining center according to one of claims 1 or 30, characterized in that the tool carrier means and the tool magazine means are adapted to be shifted by shifting means in a plane extending perpendicular to the axis of rotation of the tool spindle means.

37. A machining center according to one of claims 1 or 30, characterized in that the gap is disposed at a position between the guide means for the slide means and a portion of the machine to which the outrigger is attached, and in that a rear side of the slide means facing away from the gap is guided on said guide means.

38. A machining center for carrying out at least one of a drilling and milling operation, the machining center including a machine frame, an outrigger attached to the machine frame, a tool spindle means for rotatably driving the tool means, a tool carrier means for carrying the tool means, a tool magazine means for accommodating at least one tool carrier means, and means for mounting the tool spindle means to the outrigger so as to enable the tool spindle means to be displaced in an axial direction from an end position in alignment with a tool carrier means in the tool magazine means to a first position for enabling a coupling of the tool spindle means to the tool carrier means, and to at least one further position for machining a workpiece, and a magazine connecting means for supporting the tool carrier means during a coupling of the tool spindle means and for permitting an entrainment of the tool carrier means by the tool spindle means, characterized in that the mounting means includes a slide means arranged at the outrigger for enabling axial displacement of the tool spindle means, the tool spindle means extending through at least a zone of the slide means, means are provided for rotatably mounting the tool spindle means at the slide means, a guide means extends in parallel to an axis of rotation of the tool spindle means for guiding the slide means along a straight guide path, the guide means is arranged at a spacing from a portion of the machine frame to which the outrigger is attached, the tool magazine includes a gap for accommodating the tool carrier means to be supported by the magazine connecting means to be coupled with the tool spindle means and for enabling the zone of the slide means to pass through the tool magazine means, the magazine connecting means includes two diametrically opposed segments, the segments include shoulder portions defining further track means, the tool carrier means include a flange portion adapted to be placed on the shoulder portions, rod means are provided for supporting the segments in the slide means, the rod means are linearly guided in the slide means in parallel to a displacement direction of the slide means, and in that means are provided for spring-loading the rod means in an upward direction.

* * * * *